United States Patent [19]

Miller et al.

[11] 4,450,373

[45] May 22, 1984

[54] APPARATUS FOR VIBRATION REDUCTION IN DYNAMOELECTRIC MACHINES

[75] Inventors: William H. Miller, Albany; Joseph J. Frank, Esperance, both of N.Y.

[73] Assignee: General Electric Company, Schenectady, N.Y.

[21] Appl. No.: 531,556

[22] Filed: Sep. 12, 1983

[51] Int. Cl.³ .......................... H02K 5/24; H02K 1/12
[52] U.S. Cl. ...................................... 310/51; 310/258; 310/89
[58] Field of Search .............................. 310/51, 89–91, 310/254–259

[56] References Cited

U.S. PATENT DOCUMENTS

| | | | |
|---|---|---|---|
| 3,462,624 | 8/1969 | Darrieus | 310/51 |
| 4,012,653 | 3/1977 | Shigeta et al. | 310/259 X |
| 4,051,399 | 9/1977 | Stanwick et al. | 310/51 |
| 4,145,626 | 3/1979 | Aroshidze et al. | 310/51 X |
| 4,230,960 | 10/1980 | Mayher | 310/258 X |
| 4,291,249 | 9/1981 | Smith, Jr. et al. | 310/258 X |

Primary Examiner—Mark O. Budd
Attorney, Agent, or Firm—John F. Ahern

[57] ABSTRACT

This invention provides apparatus for reinforcing an end of a motor housing of a motor of the type having a minimum vertical dimension. The invention accomplishes this objective in one embodiment by extending two axially extending gussets, which normally terminate short of the ends of the stator housing, until they contact inside surfaces of the ends of the stator housing. A stiffening bar is added along the bottom of the ends of the stator housing between the two extended gussets to carry downward vibration forces from the rotor bearings of the motor through the end shields to mounting rails located adjacent the gussets. This improvement reduces vibration and shifts the natural vibrational resonant frequencies of the structure further away from expected vibrational excitation frequencies of the motor.

In another embodiment of the invention the end shield of the motor is provided with force transmission members disposed diagonally downwardly to a pair of mounting flange members which are engaged, upon assembly of the end shield into the housing with a pair of diagonally disposed gussets which are fastened directly to a pair of motor mounting rails, thus bypassing the motor housing in the path of support for dynamic forces generated during operation of the motor.

12 Claims, 11 Drawing Figures

APPARATUS FOR VIBRATION REDUCTION IN DYNAMOELECTRIC MACHINES

BACKGROUND OF THE INVENTION

The present invention relates to dynamoelectric machines and, more particularly, to support structures for such machines effective to reduce the vibration thereof.

Certain classes of dynamoelectric machines suffer from vibration and the resultant noise, both of which are undesirable. Classes of dynamoelectric machines which are prone to this problem include high-speed AC induction and synchronous motors and generators particularly of the type having a housing which has a substantially smaller height than its width. The structure of such AC machines is described in detail in a prior patent application Ser. No. 487,964, filed 4-25-83 to the assignee of this application, the disclosure of which and the references in which are herein incorporated by reference. The causes of such vibration and noise have not heretofore been identified and, not having been identified, they have, of course, not been resolved.

OBJECTS AND SUMMARY OF THE INVENTION

Accordingly, it is an object of the invention to provide an apparatus for reducing the vibration in a dynamoelectric machine.

It is a further object of the invention to provide an apparatus for changing the natural mechanical resonant frequencies of a dynamoelectric machine so as to displace such natural resonant frequencies outside the range of vibrational excitation frequencies produced by the dynamoelectric machine.

It is a further object of the invention to provide a means for reducing the vibration in a dynamoelectric machine which can be applied to both machines under manufacture and retrofit to previously manufactured machines.

According to an embodiment of the invention, there is provided, apparatus for reducing vibration in a motor of the type having a rotor and a stator, comprising a pair of rotor support members in end shields for the motor and including means to transmit forces generated by the rotor at the bearings through the end shields to reinforcing stiffening members in the motor housing which are directly connected to the motor support members.

Briefly stated, the present invention provides apparatus for reinforcing an end of a motor housing of a motor of the type having a minimum vertical dimension. The invention accomplishes this objective in one embodiment by extending two axially extending gussets, which normally terminate short of the ends of the stator housing, until they contact inside surfaces of the ends of the stator housing. A stiffening bar is added along the bottom of the ends of the stator housing between the two extended gussets to carry downward vibration forces from the rotor bearings of the motor through the end shields to mounting rails located adjacent the gussets. This improvement reduces vibration and shifts the natural vibrational resonant frequencies of the structure upward and away from expected vibrational excitation frequencies of the motor.

In another embodiment of the invention the end shield of the motor is provided with force transmission members disposed diagonally downwardly to a pair of mounting flange members which are engaged, upon assembly of the end shield into the housing with a pair of diagonally disposed gussets which are fastened directly to a pair of motor mounting rails, thus bypassing the motor housing in the path of support for dynamic forces generated during operation of the motor.

The above, and other objects, features and advantages of the present invention will become apparent from the following description read in conjunction with the accompanying drawings, in which like reference numerals designate the same elements.

DETAILED DESCRIPTION OF A PREFERRED EMBODIMENT

Figure 1:
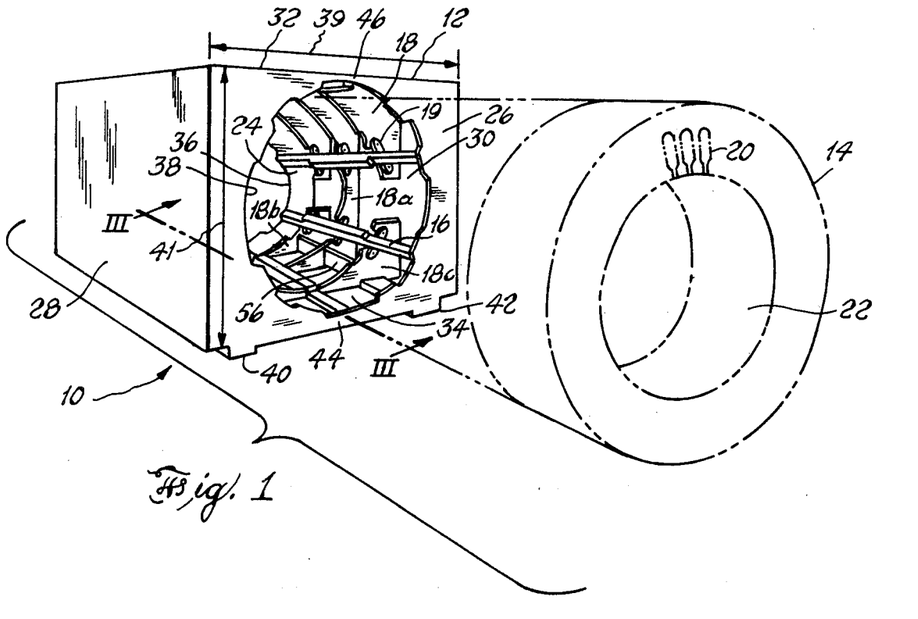
FIG. 1 is an exploded, perspective view of a part of a dynamoelectric machine to which reference will be made in describing the improvement of the present invention.

Referring now to FIG. 1, there is shown, generally at 10, portions of a dynamoelectric machine to which the vibration-reduction apparatus and method of the present invention may be advantageously applied. Dynamoelectric machine 10 which, for conciseness, is hereinafter called motor 10, includes a stator housing or frame 12 and a stator 14 shown in dot-dashed line. A set of six equally angularly spaced stator support members 16 are disposed about the interior of stator housing 12 supported by a plurality of ribs 18. Although not a part of the present invention, the connection between stator support members 16 and ribs 18 is accomplished using radial force through stator support members 16 on stator 14 to thereby secure it firmly in place within stator housing 12.

Although not shown in FIG. 1, it will be realized that a rotor containing rotor windings (not shown) is positioned concentrically within stator 14 and is caused to rotate within bearings supported in end shields (see FIG. 7) which are mounted so as to close the apertures 36 and 38 in front and rear of stator housing 12.

Stator housing 12 is a generally parallelepiped structure having first and second ends 24 and 26, first and second sides 28 and 30, a top 32 and a bottom 34. Ends 24 and 26 include apertures 36 and 38 therein for installation of the stator, rotor and end shields. It will be noted that a horizontal dimension 39 of stator housing 12 is substantially greater than a vertical dimension 41 thereof. This dimensional difference is a customary specification for certain of such motors to reduce the overall height of motor 10 as much as possible. This places the axis of the rotor shaft (not shown) at a fixed position above the mounting surface of the motor 10. Such motors have been sold in large quantities and their specifications are so firmly embedded in the industry standards (NEMA) of those specifying such devices that a change, and especially an increase, in housing height of new apparatus is unlikely to be adopted since any change would preclude replacement and/or interchangeability of motors.

Motors of the low-profile type illustrated for motor 10 have been known to develop substantial vibration. The sources of such vibration have heretofore been thought to arise from rotor or load imbalance or from non-uniformities in the air gap between stator 14 and the rotor contained therein. Such sources of vibration were thought to be aggravated by natural frequencies of vibration of motor 10 falling within a range of frequencies which may be excited by mechanical vibrations generated by motor 10. Although these beliefs of the prior art are literally correct, they overlooked a significant factor in such motors which permits the vibration to develop. In addition, since those skilled in the art failed to recognize this factor, they have heretofore been unable to apply correction as has been accomplished by our invention.

Referring still to FIG. 1, motor 10 includes a pair of mounting rails 40 and 42 which support motor 10 in its installed location. Customarily, motor 10 is securely bolted to its mounting surface using bolts through mounting rails 40 and 42. This, then, rigidly fixes the positions of mounting rails 40 and 42 and the portions of motor 10 attached directly to them. We have discovered that ends 24 and 26 tend to vibrate about the fixed positions provided by mounting rails 40 and 42, taking advantage of the relatively low stiffness offered by lip portions 44 and 46 in end 26 and corresponding lip portions hidden by other apparatus, in end 24. In some types of a large motor 10, lip portion 44, in line with the weight vector of the rotor, may be as small as two inches in vertical extent.

Figure 2:
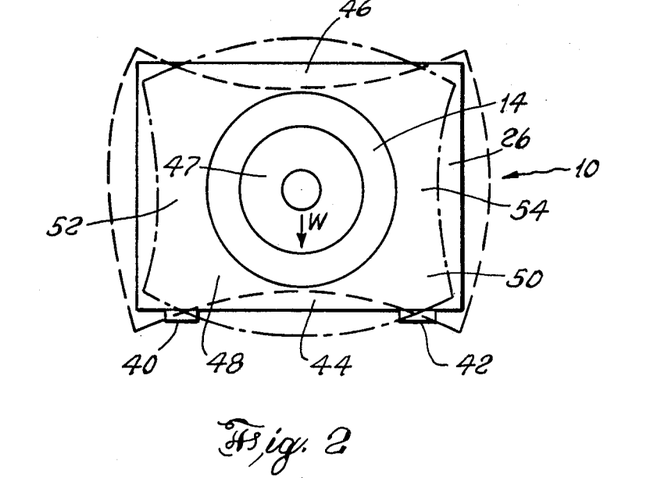
FIG. 2 is an end view of the dynamoelectric machine of FIG. 1 showing a highly exaggerated representation of one type of vibration mode thereof.

Referring now to FIG. 2 there is shown a highly schematic and exaggerated representation of the vibrational modes we have discovered in end 26 (and corresponding vibrations in end 24, not shown in FIG. 2) which have previously been either unsuspected or, if their existence was recognized, their significance was not known. The small vertical extent of lip portion 44, which is aligned with the weight vector W of rotor 47, permits a left lower portion 48 of end 26 to vibrate about mounting rail 40 and a right lower portion 50 of end 26 to vibrate about mounting rail 42 as indicated by the dashed and dot-dashed lines in the figure. As shown, side lips 52 and 54 of end 26 are vibrated inward when lip portion 44 is vibrated downward and are vibrated outward when lip portion 44 is vibrated upward. Upper lip portion 46 is vibrated upward and downward oppositely to the directions of motion of lower lip portion 44. This vibration of ends 26 (and 24) permits motor vibration and the attendant noise to develop from unavoidable weight imbalances in motor 10 or its load or variations in rotor 47. The imbalance is amplified by the close proximity of the stator housing resonance in the absence of the disclosed stiffener arrangements of the invention.

The weight vector W, then, represents the downwardly directed forces both static and dynamic transferred to the motor frame from the rotating rotor 47.

In our analysis of the vibration problem, we have compared the vibration contributions of a properly balanced rotor, the strength and mechanical stiffness of typical bearings and the strength and mechanical stiffness of the mounting arrangement including the mechanical softness of ends 24 and 26. We have concluded that the frame softness provided by the ability of the ends 24 and 26 to vibrate in the manner described is the weakest of these three support elements. Attempting to resolve vibration problems in motor 10 without facing and solving this dominating problem is likely to meet no more than marginal success.

Referring again to FIG. 1, three sets of annular ribs 18 are shown. In the particular version of motor 10 illustrated, a center rib 18a is continuous whereas intermediate ribs 18b and 18c, spaced on either side of center rib 18a approximately midway between center rib 18a and ends 24 and 26 respectfully are discontinuous in their vertical dimension. In order to strengthen the center of motor 10 between ends 24 and 26, a gusset 56 in the form of a vertically disposed plate spans the space between intermediate ribs 18b and 18c alongside mounting rail 42. Gusset 56 is welded to ribs 18a, 18b and 18c, to mounting rail 42 and preferably also to bottom 34. A similar gusset (not shown) is disposed spanning ribs 18b and 18c alongside mounting rail 40.

Figure 3:
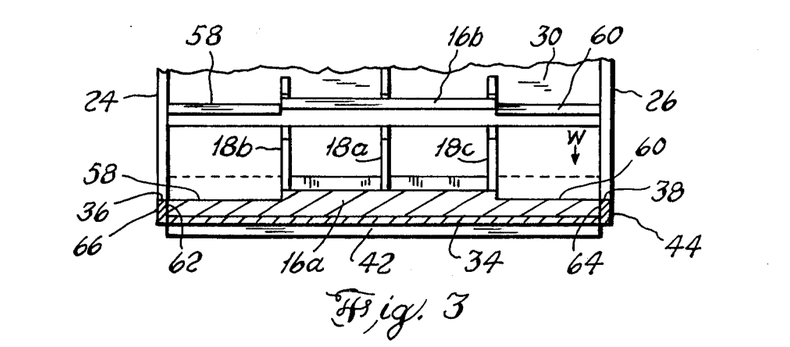
FIG. 3 is a cross section taken along III—III of FIG. 1.

Referring now to FIG. 3, an axial cross section is shown taken through a bottom stator support member 16a looking toward the inside of side 30. Stator support member 16a (as well as all other stator support members represented by member 16b) are welded at their ends 62 and 64 to the inside of ends 24 and 26. In particular, ends 62 and 64 of stator support member 16a are welded to bottom lip portions 66 and 44 of ends 24 and 26 respectively. The rotor weight vector W, is transmitted through the respective end shields of the motor from rotor 47 (FIG. 2) to bottom lip portions 44 and 66 which are relied on, in the prior art along with bottom 34, to transfer such loads to mounting rails 40 and 42.

Figure 4:
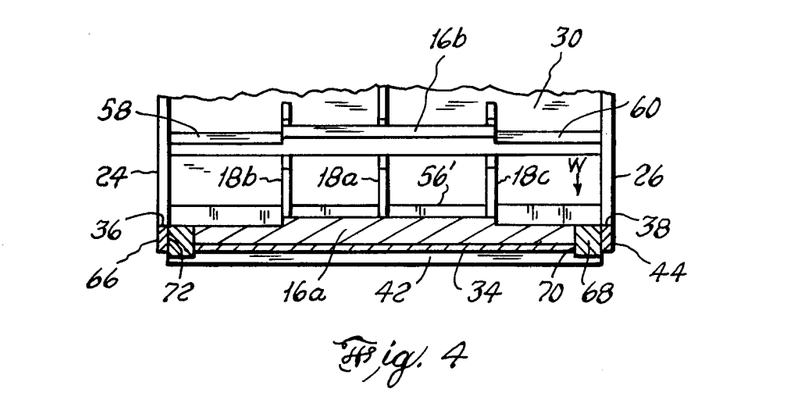
FIG. 4 is a cross section corresponding to FIG. 3 showing an embodiment of the invention.

Referring now to FIG. 4, an embodiment of the invention is shown in which a gusset 56' is extended at each end beyond intermediate ribs 18b and 18c into contact with the inner surfaces of ends 24 and 26 respectively where rigid structural welding is performed to unite these members together. A stiffening bar 68 is positioned inside bottom lip 44 spanning between gusset 56' and the counterpart of gusset 56' not shown in FIG. 4. In order to provide the maximum stiffness in the direction of the rotor weight vector W, stiffening bar 68 should have the maximum possible vertical dimension. This may be advantageously accomplished by cutting an opening in bottom 34 thus permitting stiffening bar 68 to extend therethrough and possibly slightly beyond the original outer profile of bottom 34. In the embodiment shown, the ends of bottom stator support member 16a have been shortened to admit stiffening bar 68. Stiffening bar 68 is securely welded to bottom stator support member 16a and to at least the two extended gussets 56' and its counterpart. In addition, stiffening bar 68 is also welded to bottom 34 and bottom lip portion 44 to form a rigid assembly.

A second stiffening bar 72 may be similarly installed at the opposite end of bottom stator support member 16a inside bottom lip portion 66. Since this installation is the same as stiffening bar 68, it will not be further detailed.

Figure 5:
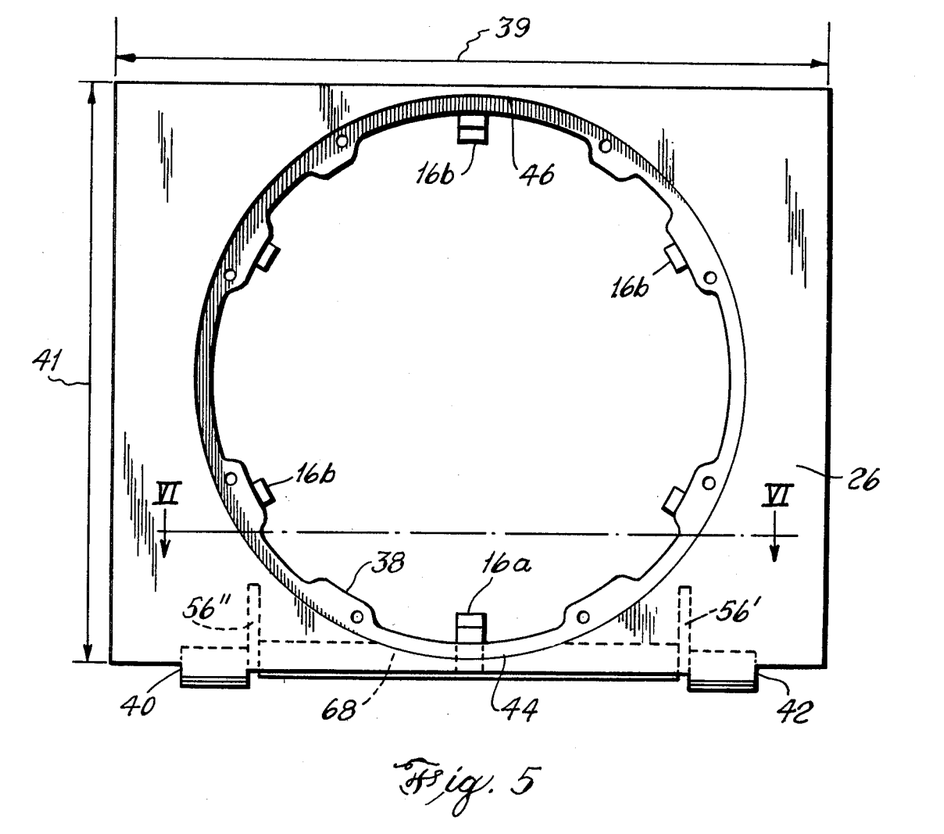
FIG. 5 is an end view of the dynamoelectric machine of FIG. 4 showing the mutual positioning of the elements of the present invention according to one embodiment.

Referring now to FIG. 5 the relationship of the described elements is shown from a front elevation. Gussets 56' and (previously hidden) 56" are welded at their axial extremities to end 26, and along their lines of abutment to mounting rails 40 and 42 and the ends of stiffening bar 68. The three-way junction of, for example, gusset 56', mounting rail 42 and end 26 forms a three-sided corner similar to the corner of a box. This corner arrangement provides mutual support to all of the members forming it particularly including resistance to rotation about any of the three orthogonal axes. A similar corner structure is formed at the junction of gusset 56", mounting rail 40 and end 26. The improved strength and stiffness achieved at the corner structures is carried through to bottom stator support member 16a by stiffening bar 68 to add substantially to the strength in that vicinity previously depending solely on the strength of bottom lip portion 44 and bottom 34 (not shown in FIG. 5). The entire lower extent of end 26 is thereby strengthened against the vibrational modes shown in FIG. 2.

Figure 7:
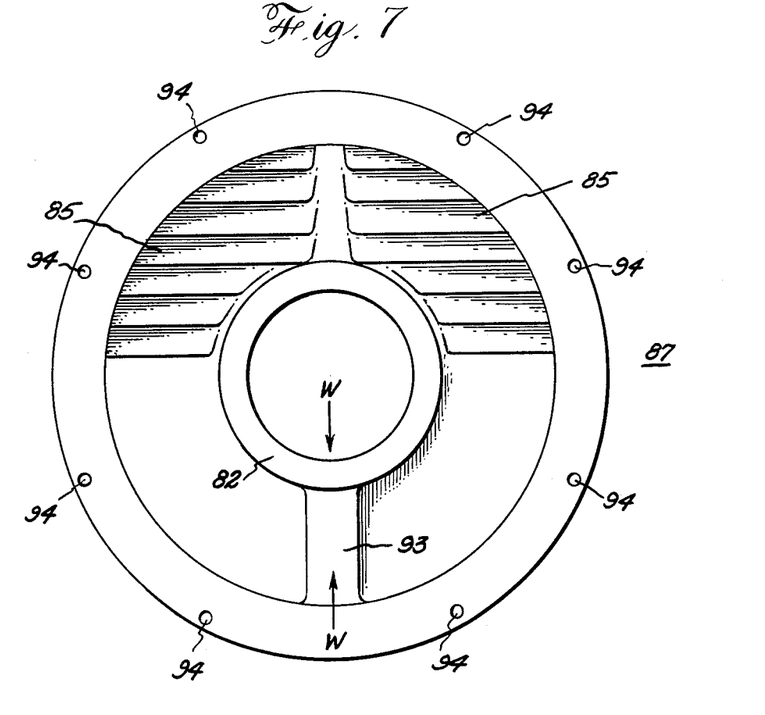
FIG. 7 is a vertical view of one end shield adapted to fit into and mate with the end of the machine frame illustrated in FIG. 5.

The motor frame, as shown in vertical view in FIG. 5, upon assembly with stator 14 and rotor 47 is closed by end shield 87, FIG. 7, which is partially inserted into the recessed flanged end 26 of motor 10 and bolted by bolts which pass through holes 94. The downward force of the weight vector W, representing static and dynamic forces transmitted to the rotor bearings by rotating rotor 47, is directed vertically downwardly to stiffening bar 68 by an integral stiffening member 93. A similar shield closes the aperture in rear end 24 and incorporates a bearing which supports the other end of rotor 47.

Figure 6:
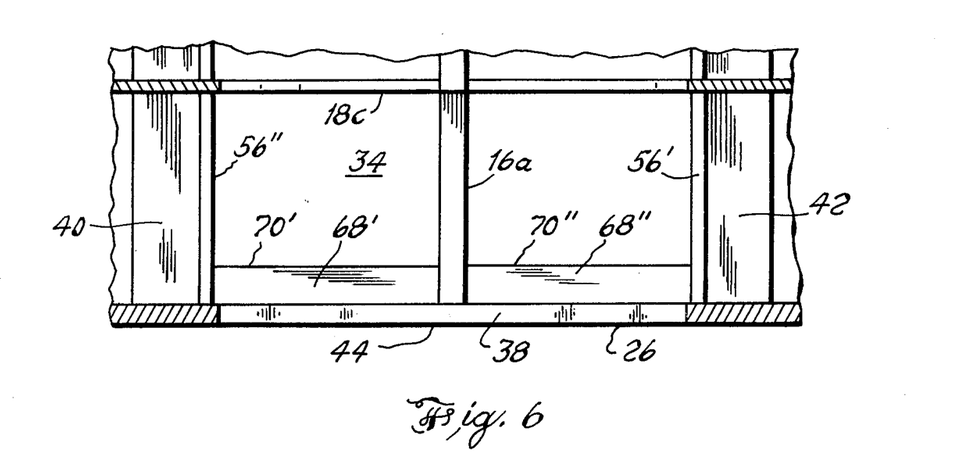
FIG. 6 is a view taken along VI—VI of FIG. 5.

The embodiment of the invention shown in FIGS. 4 and 5, in which a one-piece stiffening bar 68 (and 72) spans the space between gussets 56' and 56" is favored in manufacturing new motors 10. For retrofit of existing motors, the embodiment of the invention shown in FIG. 6 is preferred. In this embodiment, instead of a one-piece stiffening bar spanning the distance between gussets 56' and 56", a first half bar 68' is inset between bottom stator support member 16b and gusset 56". An opening 70' is preferably made in bottom 34 to permit half bar 68' to extend therethrough for maximum vertical extent and strength of half bar 68'. Half bar 68' is rigidly strtucturally welded to the abutting members including to bottom stator support member 16a. Similarly a second half bar 68" is inset in an opening 70" in bottom 34 between bottom stator support member 16b and gusset 56' and is rigidly structurally welded in place.

The embodiment of FIG. 6 avoids cutting the bottom stator support member 16a, which is in compression due to the shrink-fit between the stator frame and core. Once the elements of FIG. 6 are united by welding, however, this embodiment is functionally identical to the embodiment of FIGS. 4 and 5.

The apparatus as previously described has been shown by engineering analysis and testing to stiffen the stator frame in the horizontal direction in addition to the claimed increased vertical stiffness. The coupling of the horizontal and vertical directions is shown schematically in FIG. 2. This effect is an added feature of the apparatus and advantage thereof.

Figure 8:
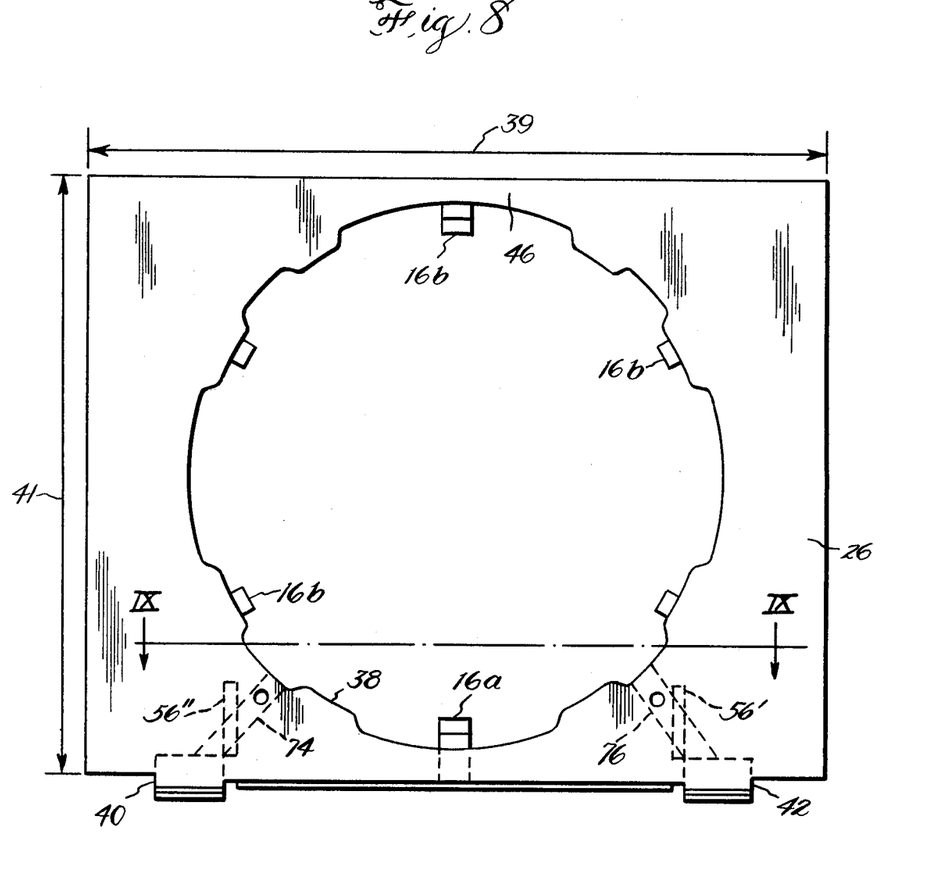
FIG. 8 is an end view similar to FIG. 5 illustrating another embodiment of the invention.
Figure 9:
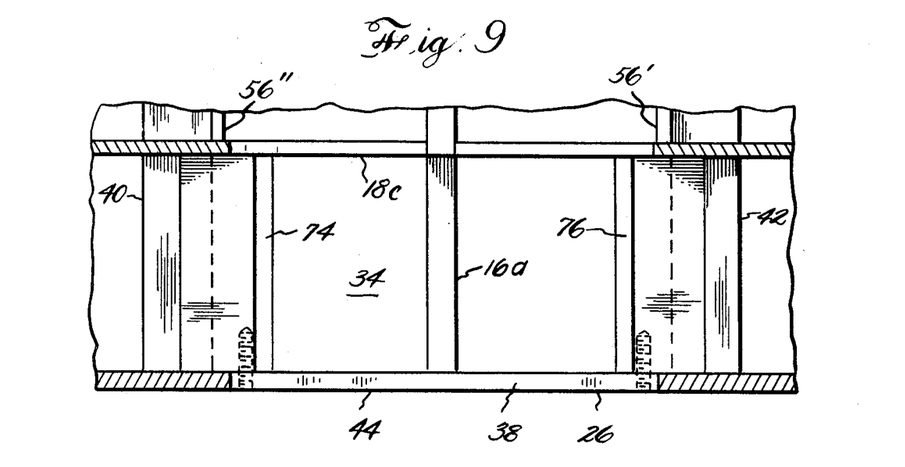
FIG. 9 is a cross section taken along lines IX—IX of FIG. 8 illustrating the same embodiment of the invention shown in FIG. 8.

In yet another embodiment of our invention, illustrated in vertical section in FIG. 8 and in partial plan view in FIG. 9, the horizontal stiffening bars 68 and 72 are replaced by a pair of diagonal stiffening plates or gussets 74 and 76 in place of bar 68 and a pair of diagonal stiffening plates 78 and 80 in place of bar 72 in the rear of the frame, each bar running from one of mounting rails 40 or 42 and extending upward and inwardly, between the front frame end 26, and rib 18c. Plate 74 is welded to mounting rail 40 at its base and to front frame end 26 at its outer edge and to rib 18c at its inner edge. Plate 76 is welded to mounting rail 42 at its base and to front frame end 26 at its outward edge and rib 18c at its inward edge.

Similarly the rear stiffening plates 78 and 80 are welded to mounting rails 40 and 42 respectively at their bases and to rear frame end 24 at their outward edges and to rib 18b at their inward edges.

Figure 10:
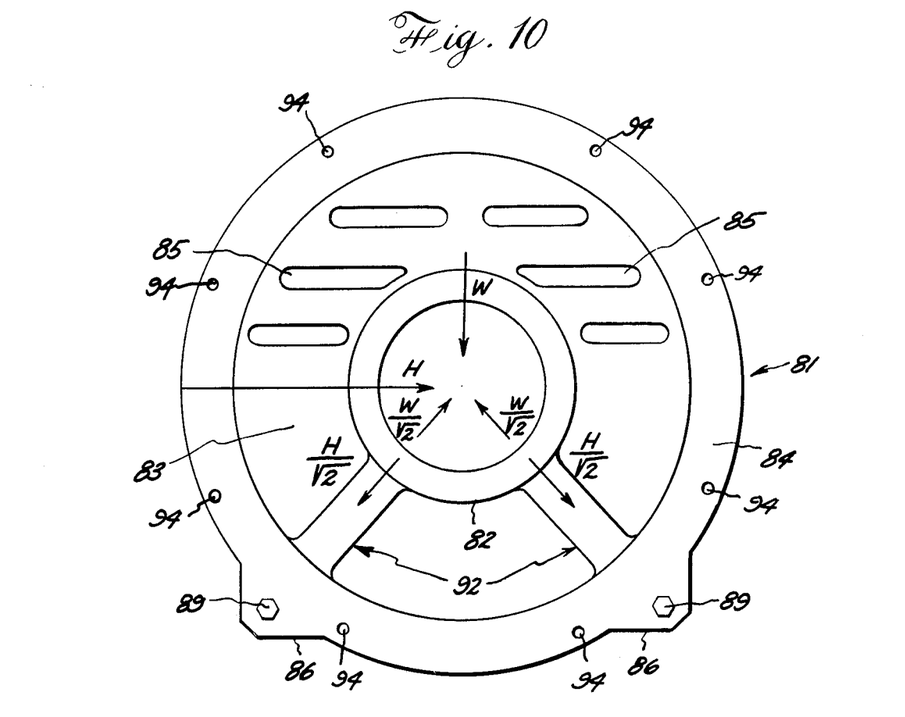
FIG. 10 is a vertical view of one end cover of a dynamoelectric machine in accord with the alternative embodiment of the invention shown in FIGS. 8 and 9, together with force vectors illustrating the distribution of such vectors in accord with this embodiment.

While the embodiments of FIGS. 3, 4, 5 and 6 are compatible with the use of the disc-shaped end shields with a vertical stiffening member 93 shown in FIG. 7 which close the frame opening and contain rotor support bearings, the embodiment of FIGS. 8 and 9 is coupled with a pair of compatible end shields, one of which is illustrated in FIG. 10 and which in addition to closing the machine frame opening and supporting the rotor end in a suitable bearing, also distributes the downwardly and horizontally directed forces due to rotor static and dynamic forces diagonally, by means of diagonally downwardly stiffening means on the respective different lower quarter sections of the end shield and a plurality of diagonally disposed tabs which are insertable in a machined-out recess in the frame end in the vicinity of stiffening plates 74, 76, 78 and 80, as is illustrated in FIGS. 8 and 9, which figures are analogous to FIGS. 5 and 6 of the prior discussed embodiment. Thus the static and dynamic stresses extending downwardly from the machine rotor 47 are directed from the bearing through the diagonally stiffened lower portions of the end shields to the front and rear frame ends at the vicinity of the upper edges of stiffening plates 72, 74, 76 and 78 and thence directly to mounting rails 40 and 42.

Figure 11:
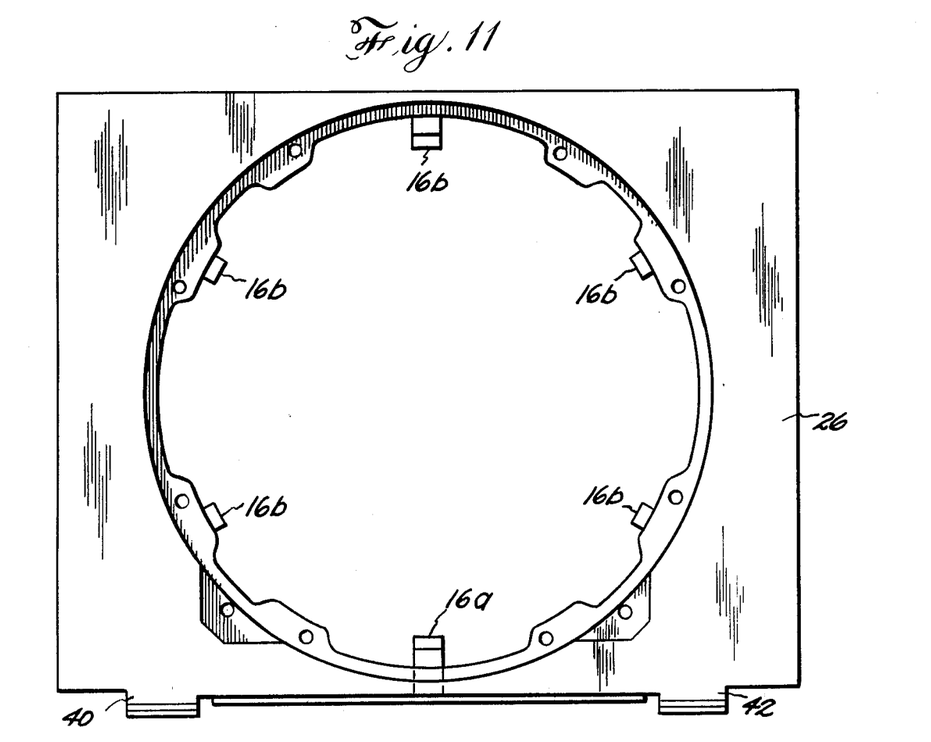
FIG. 11 is a view of an end of the machine frame in accord with the embodiment of the invention as illustrated in FIG. 8.

FIG. 10 illustrates one configuration of a modified end shield in accord with the invention. In FIG. 10, end shield 81 includes a bearing mount boss 82, an end member 83, including a peripheral rim 84 and mounting tabs 86. A plurality of cooling louvers pass through member 83 in the upper half thereof. In the lower half a pair of strengthening struts or members 92 are fabricated integrally into end shield 81 and are disposed diagonally between bearing mount 82 and tabs 86 to effectively transmit the static and dynamic forces due to the rotor in both operating and non-operating modes from the bearing mount 82 to mounting tabs 86. Each of mounting tabs 82 is apertured to receive a heavy bolt (not shown) which passes through front frame end 26 and is threaded into diagonal struts 74 and 76, thus transmitting static and dynamic downwardly and horizontally direct forces from bearing mount 82 through struts 92, mounting tabs 86, struts 74 and 76 to mounting rails 40 and 42 respectively. Struts 92 and ears 82 thus provide means to transmit the static and dynamic load of the motor rotor to stiffening struts 74 and 76. The load is also transmitted by the entire end shields being recessed into the body of ends 26 and 24 of housing 12 as shown by the counterbore of the rim of the apertures in ends 24 and 26 in FIG. 11.

In addition to the bolts which pass through ears 86 to struts 74 and 76 respectively, the end shields are held integrally with the respective front and rear ends 24 and 26 by a plurality of bolts (not shown) which pass through holes 94 in the rim portion 84 of end shields 81.

FIG. 10 also shows how any horizontal force H induced by a residual unbalance of the rotor is transmitted through end shield stiffening members 92 and subsequently into members 74 and 76 at the front end of the frame of the machine of FIG. 8 and into members 78 and 80 at the rear end thereof.

The loads due to such forces in members 92 are given as $H/\sqrt{2}$ which is that for a truss made up of relatively stiff diagonal members disposed at 45° angle to the horizontal. Therefore, other regions of the end shield 81 do not carry any substantial part of the load.

To those well versed in the art, it will be apparent that 45° is an efficient angle for balanced stiffnesses, but that angular variations from 45° are also feasible and that our invention is not restricted to the location of members 92, and associated stiffening members 74, 76, 78, 80 may be located at positions approximately 40° to 75° from the horizontal without departing from the spirit of the invention.

The structure of the end shield of this embodiment is analogous to the structure of the end shield 87 illustrated in FIG. 7 and utilized to close the motor stator and support the rotor supporting bearings in the first-described embodiment of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for reducing vibration in a motor comprising a rotor; a stator; and a sheet metal box type motor housing including first and second apertured ends in alignment with said rotor;
   a pair of end shields containing bearing support members for containing bearings rotatably supporting said rotor and adapted to close said apertured ends upon a partially recessed assembly therewith and therein;
   first and second mounting rails axially disposed along a bottom of said housing parallel with said rotor and effective to permit mounting said motor to a mounting surface;
   first and second axially disposed gussets spaced on opposite sides of said stator support member adjacent said mounting rails;
   stiffening means adjacent to a portion of the lower inside surface of said first and second ends and welded thereto;
   said end shield and said motor housing having force transmission means incorporated therein for transmitting bearing forces to said stiffening means and passing vibrational loads from said rotor through said end shields and said stiffening means to said first and second support rails.

2. The apparatus of claim 1 wherein said force transmission means includes at least one downwardly disposed force bearing strut integrally incorporated in the lower half of said end shields and in force transmission relationship with a reinforcing member affixed to at least one end member of said motor housing; said reinforcing member being affixed to at least one of said mounting rails.

3. The apparatus of claim 2 wherein said reinforcing member, said motor housing end member and said mounting rail are affixed to one another by welded joints.

4. The apparatus of claim 2 wherein said force bearing struts in said end shields are vertically downwardly disposed from said bearing housing and removably abut against said reinforcing member which is disposed between and affixed to said mounting rails.

5. The apparatus of claim 2 wherein said reinforcing member is a single integral bar.

6. The apparatus of claim 2 wherein said reinforcing member comprises a pair of aligned co-linear bars.

7. The apparatus of claim 2 wherein said end shields are partially recessed within said end members of said motor housing.

8. The apparatus of claim 2 wherein a pair of downwardly disposed force bearing struts are diagonally disposed in different quarter sections of the lower half of said end shields and are disposed between said bearing support member and respective mounting tabs at the periphery of said shield.

9. The apparatus of claim 9 wherein separate stiffening members are affixed to said ends of said motor housing and diagonally disposed between the portion of said end members corresponding in location to said tabs on said end shields and respective ones of said mounting rails.

10. The apparatus of claim 9 wherein said end shields are partially recessed into the surface of said end members of said motor housing and said tabs are apertured to permit removable fastening of said tabs to said stiffening members.

11. The apparatus of claim 8 wherein said force bearing struts and said mounting tabs in said end shields are located along respective lines which are located within angles of from 40° to 75° from the horizontal and said stiffening members affixed to said mounting rails are in angular alignment therewith.

12. The apparatus of claim 11 wherein said angles are approximately 45°.

* * * * *